US007643936B1

(12) United States Patent  
Boxberger et al.

(10) Patent No.: US 7,643,936 B1  
(45) Date of Patent: Jan. 5, 2010

(54) METHOD AND SYSTEM FOR AUTOMATIC ANALYSIS AND MANAGEMENT OF DRIVE TEST ROUTES

(75) Inventors: Scott D. Boxberger, Overland Park, KS (US); Marion B. Lawver, Lenexa, KS (US); Paul S. Smithey, Olathe, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 924 days.

(21) Appl. No.: 10/993,594

(22) Filed: Nov. 19, 2004

(51) Int. Cl.  
*G08G 1/123* (2006.01)  
*G01C 21/30* (2006.01)  
*G06F 17/00* (2006.01)

(52) U.S. Cl. .................. 701/208; 701/210; 340/995.19; 340/995.24

(58) Field of Classification Search ................ 701/200, 701/205, 207, 208, 209, 210, 211, 212, 213, 701/216, 300; 340/995.14, 995.18, 995.19, 340/995.24  
See application file for complete search history.

(56) References Cited

U.S. PATENT DOCUMENTS

| | | | |
|---|---|---|---|
| 5,451,839 A | 9/1995 | Rappaport et al. ......... 375/224 |
| 6,006,095 A | 12/1999 | Bernardin et al. ........... 455/446 |
| 6,336,035 B1 | 1/2002 | Somoza et al. .............. 455/446 |
| 6,606,494 B1 | 8/2003 | Arpee et al. ................. 455/421 |
| 6,711,404 B1 | 3/2004 | Arpee et al. ................. 455/423 |
| 6,754,487 B1 | 6/2004 | Sanders et al. .............. 455/423 |
| 6,947,835 B2* | 9/2005 | Kaplan et al. ............... 701/207 |
| 7,079,945 B1* | 7/2006 | Kaplan ....................... 701/208 |
| 2002/0009992 A1 | 1/2002 | Jensen ........................ 455/446 |
| 2002/0029108 A1* | 3/2002 | Liu et al. .................... 701/208 |
| 2002/0063656 A1 | 5/2002 | Gutowski .................... 342/360 |
| 2004/0220725 A1* | 11/2004 | Cheng ........................ 701/207 |
| 2004/0230373 A1* | 11/2004 | Tzamaloukas .............. 701/208 |
| 2005/0267677 A1* | 12/2005 | Poykko et al. .............. 701/207 |
| 2006/0095349 A1* | 5/2006 | Morgan et al. ................ 705/29 |
| 2006/0129317 A1* | 6/2006 | Farmer et al. ............... 701/213 |

* cited by examiner

*Primary Examiner*—Edward Pipala

(57) ABSTRACT

Methods and systems are disclosed for analyzing drive test data in conjunction with geographical data such as population distribution, geographical data as to wireless device usage, location of high-value customers, or other geographical data. The results of the analysis are reported to a human operator, such as a manager overseeing the drive test routes in a particular region. The results enable the operator to revise drive test routes, or select new routes, that provide improved measurement data for the wireless network.

27 Claims, 9 Drawing Sheets

METHOD AND SYSTEM FOR AUTOMATIC ANALYSIS AND MANAGEMENT OF DRIVE TEST ROUTES

BACKGROUND

The present invention relates to wireless telecommunications systems and, more particularly, to methods and apparatus monitoring network infrastructure performance by means of computer analysis of drive test results.

In a cellular radio communications system (wireless communications network), an area is divided geographically into a number of cell sites, each defined by a radio frequency (RF) radiation pattern from a respective base transceiver station (BTS) antenna. The BTS antennae in the cells are in turn coupled to a base station controller (BSC), which is then coupled to a telecommunications switch or other gateway, thereby facilitating communication with a telecommunications network such as the PSTN (public switched telephone network) or the Internet.

When a mobile station (such as a cellular telephone, pager, or appropriately equipped portable computer, for instance) is positioned in a cell, the mobile station communicates via an RF air interface with the BTS antenna of the cell. Consequently, a communication path is established between the mobile station and the telecommunications network, via the air interface, the BTS, and the gateway.

With the explosive growth in demand for wireless communications, network resources can be stressed. For instance, as the level of call traffic increases in a typical cell site, the likelihood of interference between mobile stations can increase substantially. In response to such an increase in call traffic, the base station of the cell may instruct all mobile stations in the cell to decrease their transmission power, and the base station may itself begin to communicate at a lower power level with each mobile station in the cell. With lower transmission power, however, call quality can diminish, and calls may ultimately be lost.

Further, as cities and landscapes evolve, changes to topography can substantially effect the operation of a wireless network. For instance, as buildings and trees rise or fall in or around a cell site, the radiation pattern of the cell site may change drastically. As a result of new or changed signal reflections, for instance, the signal-to-noise ratio in or around the cell site may become unacceptably low and calls may be dropped.

To help manage the call traffic in congested or evolving areas and in other circumstances, a service provider may make changes to the network, such as by repositioning cell sites, subdividing cell sites into a number of sectors, adding new cell sites, or reallocating frequencies among various coverage areas. However, in order to effectively decide when and where such changes should be made, and to otherwise provide subscribers with acceptable and expected quality of service, a need has arisen to monitor communication resources.

One way to monitor communication resources is to send technicians out into the field (i.e., into cell sites) with mobile diagnostic measurement (MDM) tools, to collect diagnostic data about network conditions. Once the data is collected, the data can be analyzed, and determinations can then be made about the state of the network and about what changes if any may be required. MDM tools are known and commercially available from companies such as ZK Celltest, Willtech (now Xcellon), Ericsson, and Agilent.

One such MDM tool may comprise a combination of a computer and one or more mobile stations connected to the computer via suitable cable connections. The computer can be programmed to send one or more instructions to the mobile stations via the cable connection, so as to cause the mobile station to take various actions and to report various parameter values to the computer. For instance, the computer may instruct the mobile station to initiate a number of phone calls or data sessions and, for each call/session, to report to the computer (i) the channel (frequency) used, (ii) the transmit power used, and (iii) an indication of whether the call/session succeeded or was dropped.

Conveniently, the MDM tool may be carried in a vehicle such as a car, so that measurements can be made at various geographic locations. One technician may drive the vehicle around town, while another technician in the vehicle can operate the MDM tool so as to record information about the network. Alternatively, the MDM tool can simply be carried in the trunk of the vehicle or elsewhere in or on the vehicle and can automatically collect information about the network. Ideally, the MDM tool would further include a GPS receiver adapted to collect location data points indicative of where the MDM tool made its measurements. The MDM tool could thus establish a log file that includes records each indicating measured network conditions and a corresponding geographic location. Further, the log file can include an MDM identifier that identifies the MDM tool that collected the data.

In a typical arrangement, the data collected by the MDM tool will then be transferred to a central reporting office, where the service provider can process the data and endeavor to make decisions about system resources. In this regard, the data could be transferred on disk or over a cable or network connection from the MDM tool to the central reporting office. Alternatively, in a preferred arrangement, the MDM tool can wirelessly report the test results to the central office, via a wireless packet data connection (e.g., via FTP) for instance.

The process of driving or otherwise conveying an MDM tool around a given geographic area to collect network information is known as "drive testing." Conveniently, a wireless carrier can arrange with a trucking company, taxicab company, public transportation company, or other carrier to mount MDM tools in various vehicles so as to collect network information from throughout a desired area as those vehicles drive along their routes, which are referred to as "drive test routes."

Background prior art references disclosing the state of the art in analysis of cell coverage in wireless networks and strategies for drive test routes include the following patents, each of which is incorporated by reference herein: Sanders et al., U.S. Pat. No. 6,754,487; Arpee et al., U.S. Pat. No. 6,711,404; Somoza, U.S. Pat. No. 6,336,035; Arpee et al., U.S. Pat. No. 6,606,494; Bemadin et al., U.S. Pat. No. 6,006,095; Rappaport et al., U.S. Pat. No. 5,451,839; Gutowski, U.S. Patent Application Publication US 2002/0063656; and Jensen, U.S. Patent Application publication US 2002/0009992.

There is a need in the art to more intelligently and efficiently plan drive test routes, for example so that a minimum of drive test units are needed to adequately measure system performance in a defined geographical market. The present invention meets that need by providing methods and systems for automated analysis of drive test data. The drive test data is analyzed in conjunction with geographical data such as population distribution, geographical data as to wireless device usage, and other factors with the aid of a computing system. The results of the analysis are made available for use by a human operator, such as a manager overseeing the drive test routes in a particular region, so as to enable the operator to revise drive test routes, or select new routes, that provide improved measurement data for the wireless network.

SUMMARY

The present invention provides a method and system for monitoring and analyzing drive test routes and facilitating improved drive testing. According to a first aspect of the invention, a computer system will compile drive test data collected over one or more drive test routes through a given market (geographic area of interest) and will analyze the route(s) to determine whether they satisfy or violate one or more defined conditions. In response to a determination that the route(s) satisfy or violate one or more defined conditions, the computer system may then automatically generate an output signal such as an alert message and/or a proposal for revision of the route(s).

In one embodiment, for instance, the invention involves comparing two or more drive test routes over a given time period to determine an extent to which the drive test routes overlap each other—thus representing an inefficiency in the process. In response to a determination that the drive test routes overlap each other more than a threshold amount, the computer system then generates and sends a message that advises a person about the overlap condition. The person can then take action to remedy the situation, such as by moving the MDM tools to other vehicles or adjusting the routes of one or more vehicles. Alternatively or additionally, the computer system could generate another sort of signal that may invoke a process of automatically developing one or more proposed improved routes.

To analyze the extent to which the drive test routes overlap each other, the computer system can evaluate GPS data points within the drive test data and determine an extent to which the GPS data points of multiple drive test routes represent common locations. To simplify the analysis, for instance, the market area at issue can be divided into a geographic grid defining individual grid elements or blocks. For each drive test route, the computer system can then flag each block through which the route passed. In turn, the computer system can then generate a count or other measure (e.g., percentage) of the number of blocks through which more than one drive test route passed. If that measure exceeds a threshold, then the computer system can generate a message indicating this result.

In another embodiment, the invention involves determining an extent to which one or more drive test routes have covered a relevant population in a given market. In response to a determination that drive test routes have not covered a threshold extent of population in the given market, the computer system then generates and sends a message that advises a person about the situation. The person can then take action to remedy the situation, such as by moving the MDM tools to other vehicles or adjusting the routes of one or more vehicles. Alternatively or additionally, the computer system could generate another sort of signal that may invoke a process of automatically developing one or more proposed improved routes.

To analyze the extent to which a drive test route covers a given population in a market area, the market area could be divided into a plurality of blocks, each having a measured (or approximated) population. The computer system could then flag each block through which the drive test route passed and could then total the population of those blocks to establish a covered population value. The computer system could then compare the covered population with the total market population to derive an extent (e.g., percentage) of population covered. If that extent of population is less than a desired threshold, such as 60%, the computer system may then generate a message advising of this or suggesting an alternative route.

In a more refined embodiment, by reference to the geographic data points in the drive test data, the computer system could compute the length along which a drive test route passed through each block. (If the drive test route passed along a straight line through the block, the length would be simple to compute. If the drive test route passed over a curved path through the census block, the length could be approximated as the sum of lengths between each successive geographic data point recorded in the drive test data). The computer system could then multiply the length by a width representing the range of communication to/from the MDM tool (e.g., 400 feet), so as to establish an approximate measure of the area of the block actually covered by the drive test route. That area could then be compared to the total known area of the block to determine a fraction of the census block covered. The fraction could be applied to the population of the block to establish an approximation of the population covered as the drive test proceeded through the block. The computer system could add those measures together for each block through which the drive test passed and, as noted above, could then compare the total covered population with the total market population. If the total covered population does not cover at least a threshold extent of the total market population, then the computer system can generate a message indicating this.

In a related embodiment, the invention involves determining which of a set of census blocks or other geographic blocks one or more drive test routes did not pass through during a given time period, and responsively generating a set of drive test route instructions to facilitate drive testing through those missed blocks. For instance, the computer system could flag each block through which one or more drive test routes passed and could then generate a listing of the uncovered blocks. The listing could then be used as a direction for a drive test driver to cover. Alternatively, the computer system could produce a route (e.g., shortest path) through the uncovered blocks, to serve as specific driving directions for a drive test driver. Other examples are possible as well.

While the above examples have described analysis and management of drive test routes based on geographic population distributions, the analysis of drive test coverage could be based on other geographical data, including data as to (a) where the customers use their phone, e.g., from call attempt or minute-of-use data that is present in the wireless carrier system, (b) where the problems in wireless service tend to be located, e.g., from data on dropped calls and data where blocked calls are occurring, and (c) where a subset of customers such as so-called "high value" customers are or where such customers use their phones. In situation (c), wireless service providers maintain databases of call-detail records for their customers that can be mined to determine customers with a high volume of calls (or other indicia of value). Such databases can also be mined to determine where those customers are located (e.g., their billing address) and also to geographical locations of where these high value customers are using their phones.

The computing unit analyzing drive test routes could prioritize these parameters (and possibly other parameters as well), for example using weighting formulae, when determining whether the drive test routes satisfy a criteria, e.g., are adequate according to some predetermined drive test standard. The computing unit might, for example, weight geographic data as to wireless device usage (parameter (a) above) high, and weight geographic data for high-value customers (parameter (c) above) high, and weight general population distribution data and geographic data for problem areas (parameter (b) above) low, and then analyze existing drive test routes with this weighting to determine the adequacy of the drive test routes, and generate a signal proposing modifications to the routes. For example, the computer could generate a map showing areas that are insufficiently covered with existing drive test routes (perhaps with the areas given high weighting shown on the map) and propose modifications to the drive test routes to more thoroughly test the areas that are weighted high that are missed with existing drive test routes.

Further details on these and other aspects of the invention will be more fully appreciated from the following detailed description.

BRIEF DESCRIPTION OF THE DRAWINGS

FIG. 3 also shows a proposed new drive test route in dashed lines that eliminates the overlap

DETAILED DESCRIPTION OF PREFERRED EMBODIMENT

Figure 1:
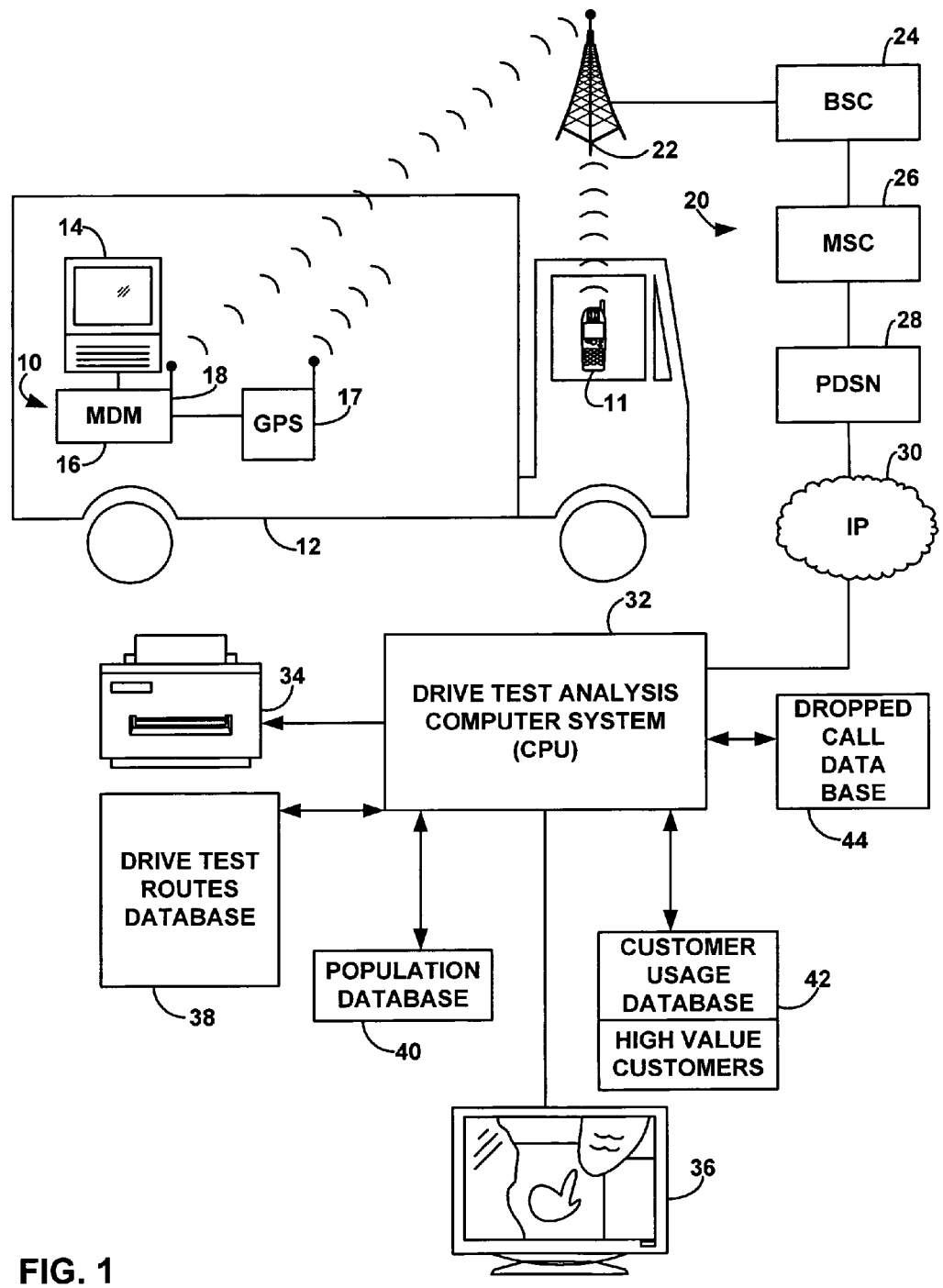
FIG. 1 is a block diagram of a system for analyzing drive test routes in accordance with one possible embodiment, and also showing a vehicle carrying an MDM tool for use in a drive test.

FIG. 1 is a block diagram of a system for monitoring and analyzing drive test routes and facilitating improved drive testing. The system includes up to N drive test units 10 that are installed in vehicles 12 (trucks, taxis, cars, buses, etc.). The drive test units 10 include a computer 14, an MDM tool 16 and a GPS satellite receiver 17 that receives location data from orbiting GPS satellites in known fashion as the drive test vehicle 12 drives through a region during the test. The location data is provided to the MDM tool 16 so that a correlation between MDM measurement data taken by the MDM tool 16 and GPS location can be made. The drive test units include an antenna 18 for transmission of the drive test data in real time via a cellular communications infrastructure 20 to a drive test analysis computer system 32 for analysis. Alternatively, the drive test data can be stored locally and formatted for inspection by an operator, e.g., on the user interface of the computer 14, in which case the MDM data can be sent from the computer 14 to the drive test analysis computer system 32 at the end of the route or later.

The cellular infrastructure 20 is conventional and includes a plurality of base transceiver station antennae 22 which receive signals from the MDM tool 16. The antennae are coupled to a base station controller 24, which is in turn coupled to a mobile switching center 26 and packet data serving node 28 coupling the mobile switching center 26 to a packet switched network 30. The network 30 may be for example the backbone network of the wireless system service provider, e.g., Verizon or Sprint. MDM data is sent from the tool 16 via the infrastructure 20 where it is received at a central drive test analysis computer system 32. The system 32 includes a central processing unit executing programmed instructions and attached peripheral devices including a printer 34 and a user interface 36. The system 32 accesses a number of databases or memory elements storing information pertaining to drive test route analysis, including a database 38 containing drive test routes in the region of interest and MDM data along such routes, a database 40 containing population distribution data for the region of interest, a database 42 containing customer usage data (e.g., where calls are being made from), and the location of high value customers or where such customers use their phone, and a database 44 of call anomaly data such as dropped calls. The databases 28, 40, 42 and 44 could be local to the computer system 32 or could be elsewhere on the carrier system network 30.

The drive test routes stored in database 38 could be arranged as maps, i.e., image files, with the routes marked in some fashion, or as a log of GPS data where the MDM measurements of all the drive test units were made, or in some other form. The population database 40 could be obtained from publicly available U.S. Census Bureau information or other government or private source, and typically will show population distribution over a given area such as in the form of shaded areas of known boundary where the population density is at a certain level, say between 100 and 500 persons per square mile, between 500 and 1,000 persons per square mile, between 1000 and 5,000 per square mile, more than 5,000 per square mile, etc.

The information in the databases 42 and 44 will typically be specific to a wireless service provider and thus will not generally be publicly available, however wireless service providers typically maintain call records for their customers in this form or in some other form that can be mined or processed to a form suitable for use storage in the databases and use in carrying out the present invention.

According to a first aspect of the invention, a method for improving drive testing of a wireless communications network is provided. The method includes a first step of collecting drive test data from one or more drive test routes and storing the drive test data in a central database. For example, for a market such as the greater Chicago area, a plurality of N drive test vehicles 12 each equipped with drive test units 10 conduct their normal drive test routes and the MDM and GPS data is sent from the drive test units to the drive test analysis computer system 32.

The method continues with a step of analyzing the drive test routes with a programmed computing unit (computer 32) to determine whether the drive test results satisfy one or more defined conditions. For example, the defined condition might be some percentage, say 20%, of the highest population density of the region covered by the drive test units, or drive test units with less than some percentage, say 10%, of overlap between two or more drive test units. These defined conditions will typically be user defined and can be programmed as queries of the drive test database 38. The computer 32 processes the data in the database 38 in view of the query or condition specified by the user.

The method continues with the step of automatically generating an output signal relating to the analysis for use by a human operator to improve the drive test routes. For example, the computer could process the query and return a Boolean value of YES or NO in response to the query. Alternatively, the computer could respond with a display of a map showing the areas of overlap in drive test routes, which the operator could use to re-deploy drive test resources. As another example, the computer could respond with a map showing the population density distribution of the area, with the areas covered by the drive test routes shown on the map, and with numeric values showing the percentage coverage by the drive test vehicles of the areas of each population density. Other types of outputs are of course possible from the present disclosure, and the above examples are just a few of the possibilities. For example, the computer could be programmed to recommend drive test routes to more completely cover the areas with highest population density or highest cell phone use, either in general terms (e.g., through shading of areas on a map needing more coverage) or through specific routes (along specific streets).

Figure 2:
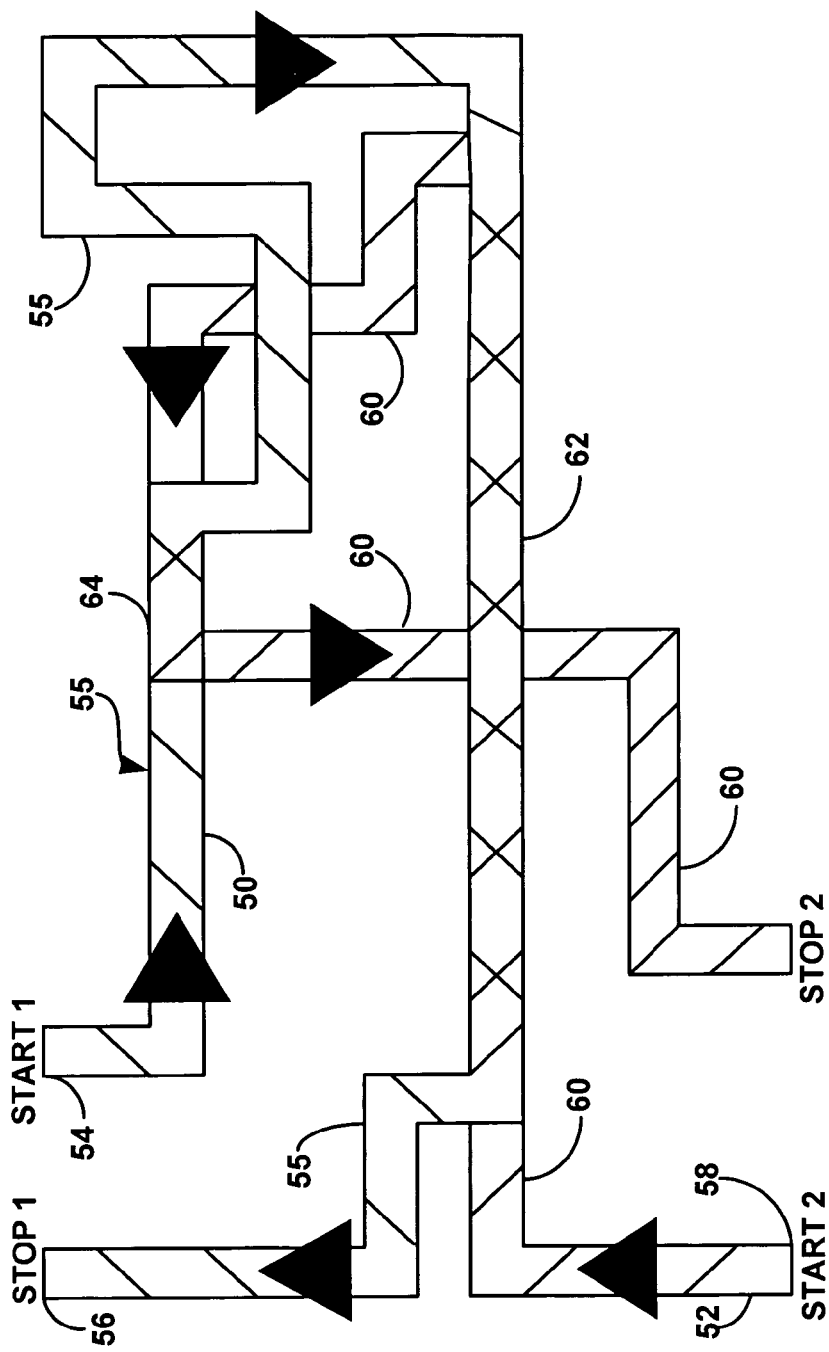
FIG. 2 is an illustration of two drive test routes that overlap to a substantial extent; the system of FIG. 1 will detect such overlap and may propose an alternative drive test route program that reduces or eliminates the overlap.

In one embodiment, for instance, the invention involves comparing two or more drive test routes over a given time period to determine an extent to which the drive test routes overlap each other—thus representing an inefficiency in a drive test regime. FIG. 2 is an illustration of two drive test routes 1 and 2 (50 and 52, respectively) to illustrate how this might be done. Drive test 50 starts at a start location 54, traverses a path 55 through the region of interest, and returns to a location 56. Similarly, drive test route 52 starts at a location 58, traverses a path 60 through the region and ends at a location 62. Note that the two paths 55 and 60 overlap to a substantial extent at portions 62 and 64 shown with the XXXXX symbols. The system of FIG. 1 will detect such overlap, e.g., by analysis of GPS data from paths 55 and 60. For example, a user could query the computer 32 to determine whether any overlap occurs between two routes and if so the extent (area) of overlap or whether the overlap is greater than a threshold area, where area is the path length of the overlap multiplied by the range of the MDM tools. The computer could report the result of this analysis either on the user interface of the computer system 32 or print out a report showing the overlap. The computer could also propose an alternative drive test route program that reduces or eliminates the overlap.

Alternatively, in response to a determination that the drive test routes 55 and 60 overlap each other more than a threshold amount, e.g., 10 percent of the total area coverage of either route, the computer system could then generate and send an alarm message that advises a person about the overlap condition. The person could be the operator of the computer system 32 or the driver of the drive test vehicle. For example, referring to FIG. 1, the driver may be reached by a cell phone 11. The driver could then take action to remedy the situation, such as by driving a different route in response to instructions from the operator (e.g., "get off Broadway and go down 14$^{th}$ avenue to Prichard Street and go left on I-25"). Alternatively, the operator could move the MDM tools to other vehicles and/or permanently adjusting the routes of one or more vehicles. Alternatively or additionally, the computer system could generate another sort of signal that may invoke a process of automatically developing one or more proposed improved routes.

Figure 3:
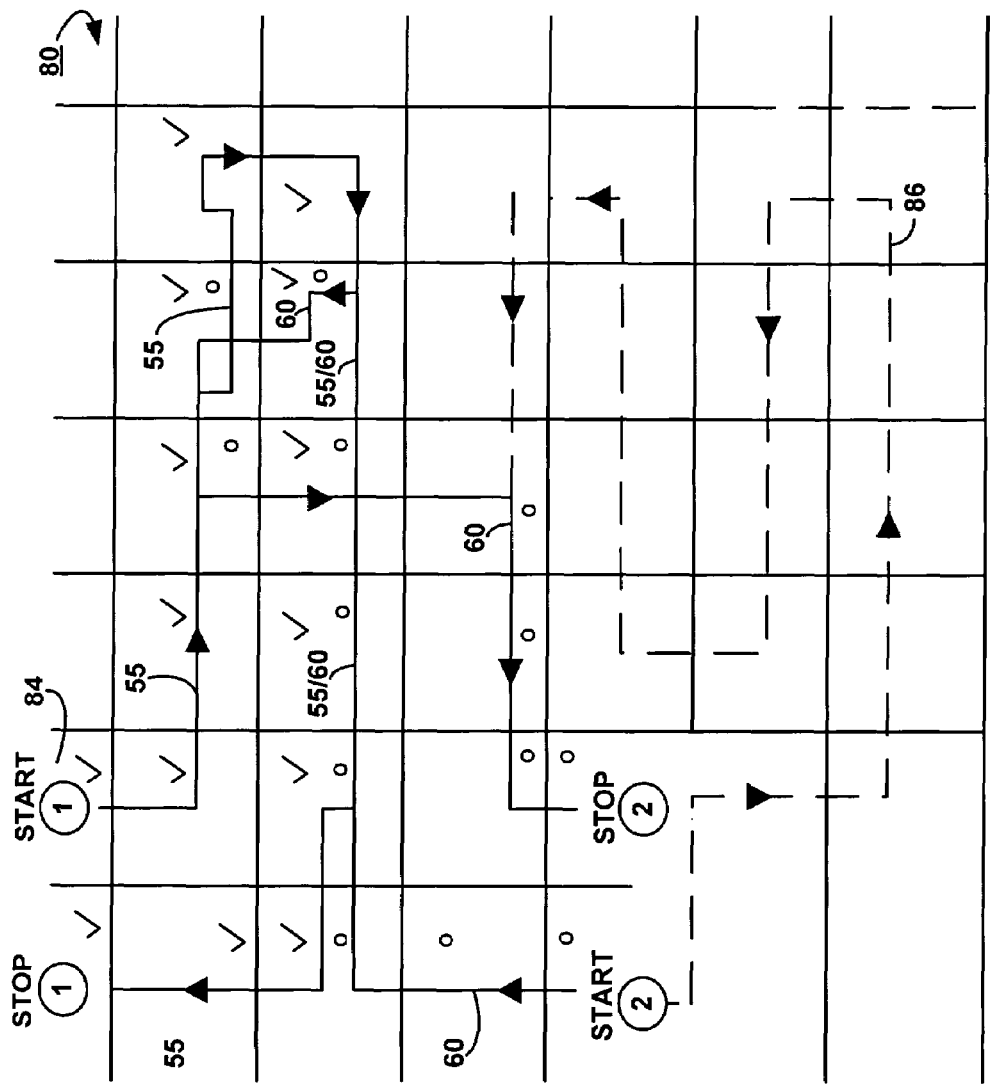
FIG. 3 is an illustration of the two drive test routes of FIG. 3 superimposed on a grid, showing the substantial overlap between the two routes. The grid of FIG. 3 could be displayed on monitor of the computer system of FIG. 2 to show an operator the overlap.

To analyze the extent to which the drive test routes overlap each other, the computer system can evaluate GPS data points within the drive test data and determine an extent to which the GPS data points of multiple drive test routes represent common locations or are within a predetermine distance from one another (e.g., 200 feet). To simplify the analysis, for instance, the market area at issue can be divided into a geographic grid defining individual geographic blocks or grid elements. See FIG. 3, showing a region 80 divided into a grid 82. For each drive test route 55 and 60, the computer system can then flag each block or element 84 of the grid through which the route passed (as indicated by the check mark for route 55 and a "0" for route 60). In turn, the computer system can then generate a count or other measure (e.g., percentage) of the number of blocks through which more than one drive test route passed. In the example of FIG. 3, there are seven blocks or grid elements of overlap, elements with both a check and an "O". If that measure exceeds a threshold, then the computer system can generate an alarm message. For example route 55 passes through 14 grid elements, and route 60 passes through 13 grid elements and there are seven blocks with an overlap between routes 55 and 60. So, if the threshold is set at 40 percent overlap, routes 55 and 60 exceed that threshold. The operator could be alerted to this situation and then may see that route 60 should be modified to eliminate the overlap. For example, the operator could re-orient route 60 such that it takes the dashed lined path 86 in FIG. 3, which has no overlap with route 55.

Figure 4:
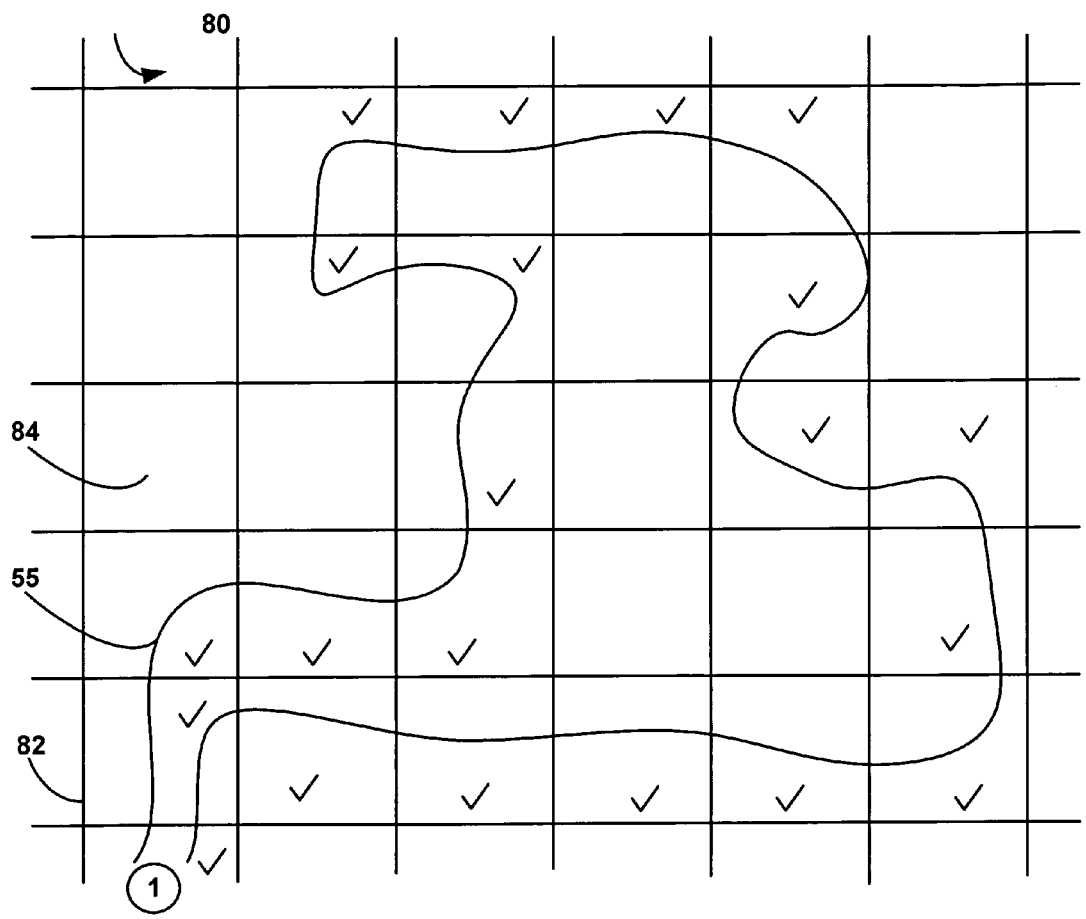
FIG. 4 is an illustration of a drive test route superimposed on a grid, with the check marks indicating that the route has passed through an element or block of the grid.
Figure 5:
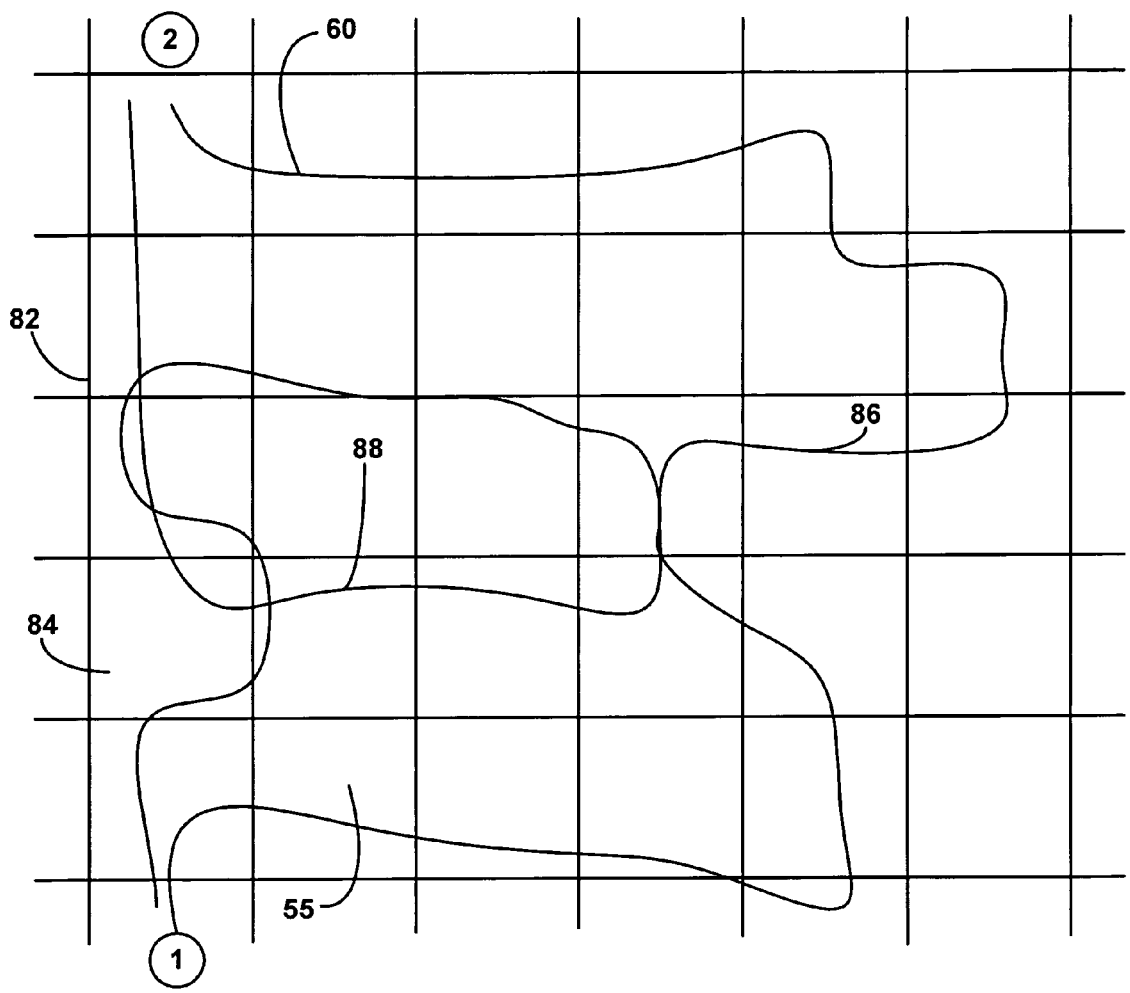
FIG. 5 is an illustration of the drive tests route and grid of FIG. 4, with a new drive test route shown which passes through most of the blocks of the grid which were not passed through by the first drive test route.

FIG. 4 shows another example of a region 80 with a drive test route 55 shown going through the region, with a check mark indicating the blocks or elements of the grid 82 through which the route passes. FIG. 5 shows a second route 60 which is planned to cover many of the blocks or elements in the grid missed in the first route 55. The actual overlap in these two routes in the point or intersection where the two paths cross, locations 86 and 88, and there are only 3 grid elements common to each path.

In another embodiment, the method can be used to determine an extent to which one or more drive test routes have covered a relevant population in a given market. As one example, a pre-defined region is divided into a grid of individual blocks, each having either a known or estimated population. The analysis performed by the computer 32 comprises the steps of 1) flagging each block through which at least one drive test route passed; 2) totaling the population of the flagged blocks; and 3) comparing the population of the flagged blocks with the total population in the pre-defined region. The output from the computer analysis provides an indication of the result of the comparison. In response to a determination that drive test routes have not covered a threshold extent of population in the given market, the computer system then generates and sends a message that advises a person about the situation, e.g., the operator or the driver of a drive test vehicle. The person can then take action to remedy the situation, such as by moving the MDM tools to other vehicles or adjusting the routes of one or more vehicles. Alternatively or additionally, the computer system could generate another sort of signal that may invoke a process of automatically developing one or more proposed improved routes.

For example, in FIG. 4 or 5, each element of the grid 82 could be assigned a population figure. The population estimate need not be exact, but rather could be determined from the area covered by the grid area multiplied by the population density (which could be obtained from US Census Bureau statistics). The computer system could then flag each block through which the drive test route passed and could then total the population of those blocks to establish a covered population value, such as the population value of route 55 in FIG. 4. The computer system could then compare the covered population with the total market population in the entire region 80 to derive an extent (e.g., percentage) of population covered. If that extent of population is less than a desired threshold, such as 60%, the computer system may then generate a message indicating that the coverage is below a threshold. The operator could then review the drive test route and the population density data and adjust the route to go through more heavily populated areas or establish a new route (route 60 in FIG. 5) to cover most or all of the areas missed by route 55.

Figure 6:
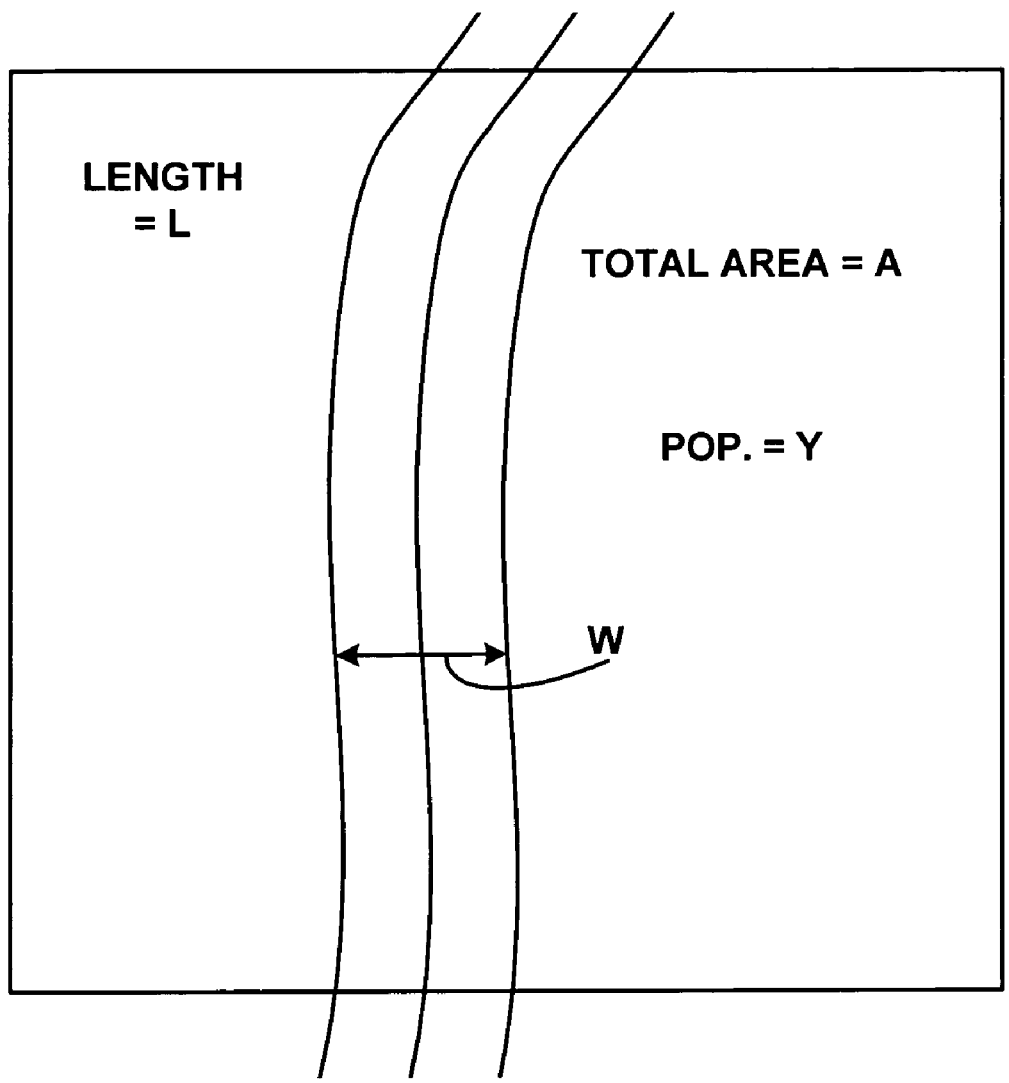
FIG. 6 is an illustration of one grid element in a grid (could be the grid of FIG. 4), showing the geographical area covered by the drive test vehicle being the product of the path length L of the vehicle through the grid element multiplied by a width W that is approximately equal to the range of the MDM tool in the vehicle.

In a more refined embodiment, by reference to the geographic data points in the drive test data, the computer system could compute the path length along which a drive test route passed through each block (grid element 84). If the drive test route passed along a straight line through the block, the length would be simple to compute (take the difference in geographical coordinates and compute the distance directly). If the drive test route passed over a curved path through the census block, the length could be approximated as the sum of lengths between each successive geographic data point recorded in the drive test data. The computer system 32 then multiplies the path length by a width representative the range of communication to/from the MDM tool 16 (e.g., 400 feet), so as to establish an approximate measure of the area of the census block actually covered by the drive test route. See FIG. 6 showing a grid element 84 showing a drive test path length L and a width W representing the range of communication of the MDM tool carried along the path length. That area (approximately W×L) could then be compared to the total known area A of the census block or grid element 84 to determine a fraction F the census block covered: F=(W×L)/A. This fraction could be multiplied by the population of the census block (Y) to establish an approximation of the population covered as the drive test proceeded through the block, $P_b$, i.e., $P_b$=F×Y.

The computer system could add the values $P_b$ measures together for each block through which the drive test route passed and, as noted above, could then compare the total covered population ($\Sigma\ P_b$) with the total population of the region of interest 80. If the total covered population does not cover at least a threshold extent of the total market population, then the computer system can generate an alarm or other message and alert the operator that the drive test routes should be revised.

In a related embodiment, the analysis performed by the computer 32 could determine which of a set of census blocks or other geographic blocks one or more drive test routes did not pass through during a given time period, and responsively generating a set of drive test route instructions to facilitate drive testing through those missed blocks. For instance, the computer system could flag each block through which one or more drive test routes passed and could then generate a listing of the uncovered blocks (all the blocks in FIG. 4 without a check mark). The listing could then be used as a direction for a drive test driver to cover. Alternatively, the computer system could produce a route (e.g., shortest path) through the uncovered blocks, to serve as specific driving directions for a drive test driver.

Figure 7:
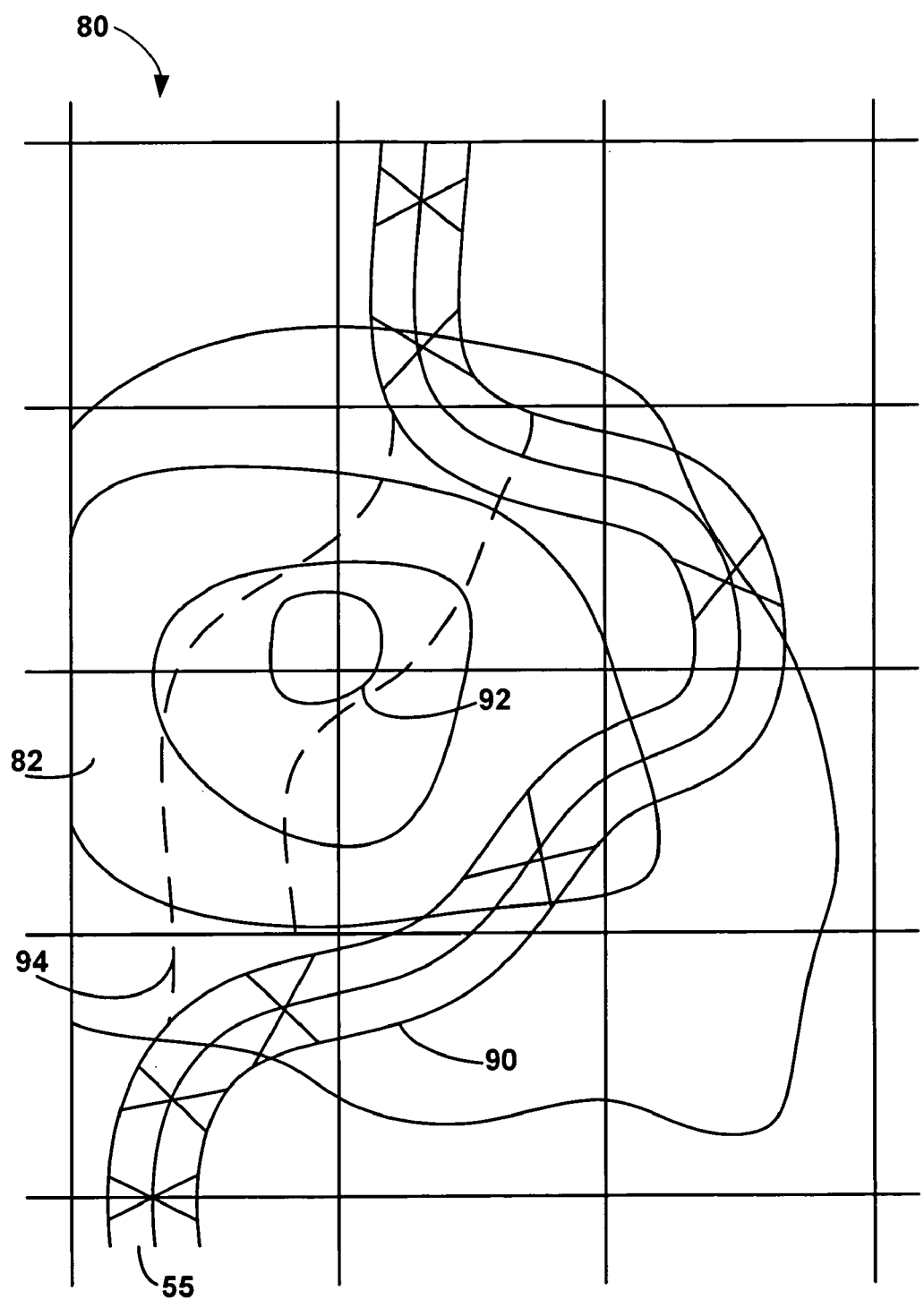
FIG. 7 is an illustration of a grid superimposed on a density distribution of an area (which could be population or cell phone usage distribution), showing the coverage area of a drive test route through the distribution and a modified drive test route in dashed lines that achieves better coverage of the density distribution.

Consider for example FIG. 7 showing a region 80 with a grid 82 overlaid on the region, and showing the population density distribution in the region 80. The region 80 also shows the path of a drive test route 55 and the area coverage of the drive test route 55 indicated as hatched area 90; the area 90 dictated by the range of the MDM tool aboard the vehicle used in route 55. The population density is shown as a series of curves with the center 92 indicating the area of highest population density of the area. The process as described above would result in the operator being notified that the route 55 does not do a very good job of covering the areas of highest population density. Hence, the system (or operator) could propose a modification of the drive test route to go along the path 94 shown in dotted lines, which would pass through the area of highest population density.

While the above examples have described analysis and management of drive test routes based on geographic population distributions, the analysis of drive test coverage could be based on other geographical data, including data as to where the customers use their phone, e.g., from call attempt or minute-of-use data that is present in the wireless carrier system. For example, FIG. 7 could also be used to represent a geographic density distribution of cell phone usage, with center 92 corresponding to the area where the highest concentration of cell phone usage is occurring. Such usage could be determined from minutes of use data or call attempt data. Such data could be obtained from call record databases maintained by the cell phone service provider. The drive test route 55 could be modified such that the route passes through the areas of highest cell phone usage.

Figure 8:
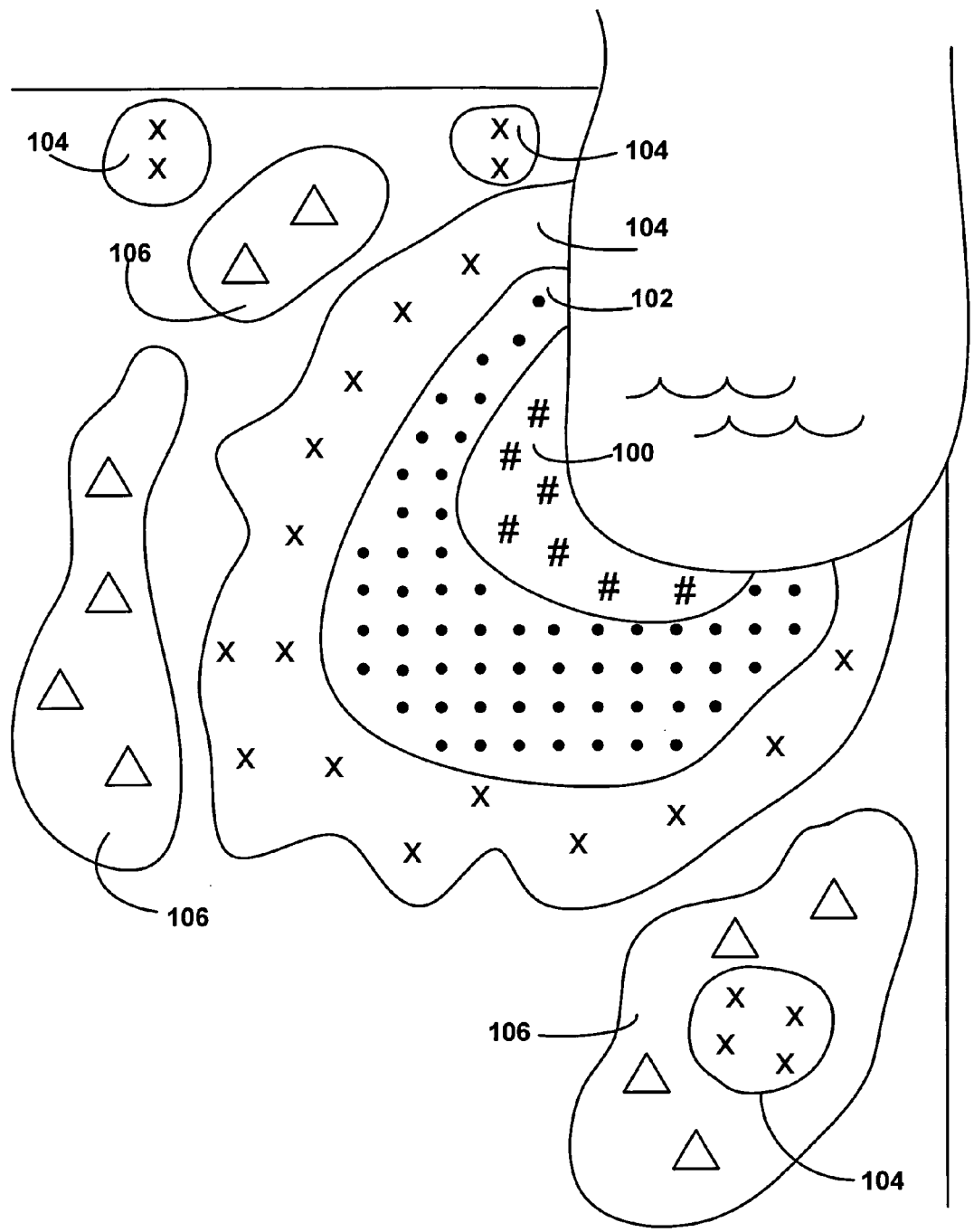
FIG. 8 is an illustration of a region showing the geographic distribution of cell phone usage, which can be used to plan analyze drive test routes.

Consider for example FIG. 8, which is intended to represent the greater Chicago area. Area 100 is the downtown area with the highest usage of cell phones, area 102 indicates where the next highest amount of cell phone use occurs, area 104 indicates areas of lesser usage of cell phones, and area 106 indicates area of less phone usage than area 104. The drive test routes could be planned to traverse primarily areas 100, 102 and also 104 and 106. The blank areas 108 would be a less priority in drive testing. The drive test routes could be superimposed on the map of FIG. 8 and the analytical techniques described above used to determine the efficiency of drive testing in areas where usage is occurring.

As another example, instead of population or usage density distribution, the geographic area could be plotted as a function of the area where problems in wireless service tend to be located, e.g., from data on dropped calls and data where blocked calls are occurring. As still another example, the geographical data could be plotted as a function of where so-called "high value" customers are or where such customers use their phones. In this latter situation, wireless service providers maintain databases of call-detail records for their customers that can be mined to determine customers with a high volume of calls (or other indicia of value). Such databases can also be mined to determine where those customers are located (e.g., their billing address) and also to geographical locations of where these high value customers are using their phones.

Figure 9:
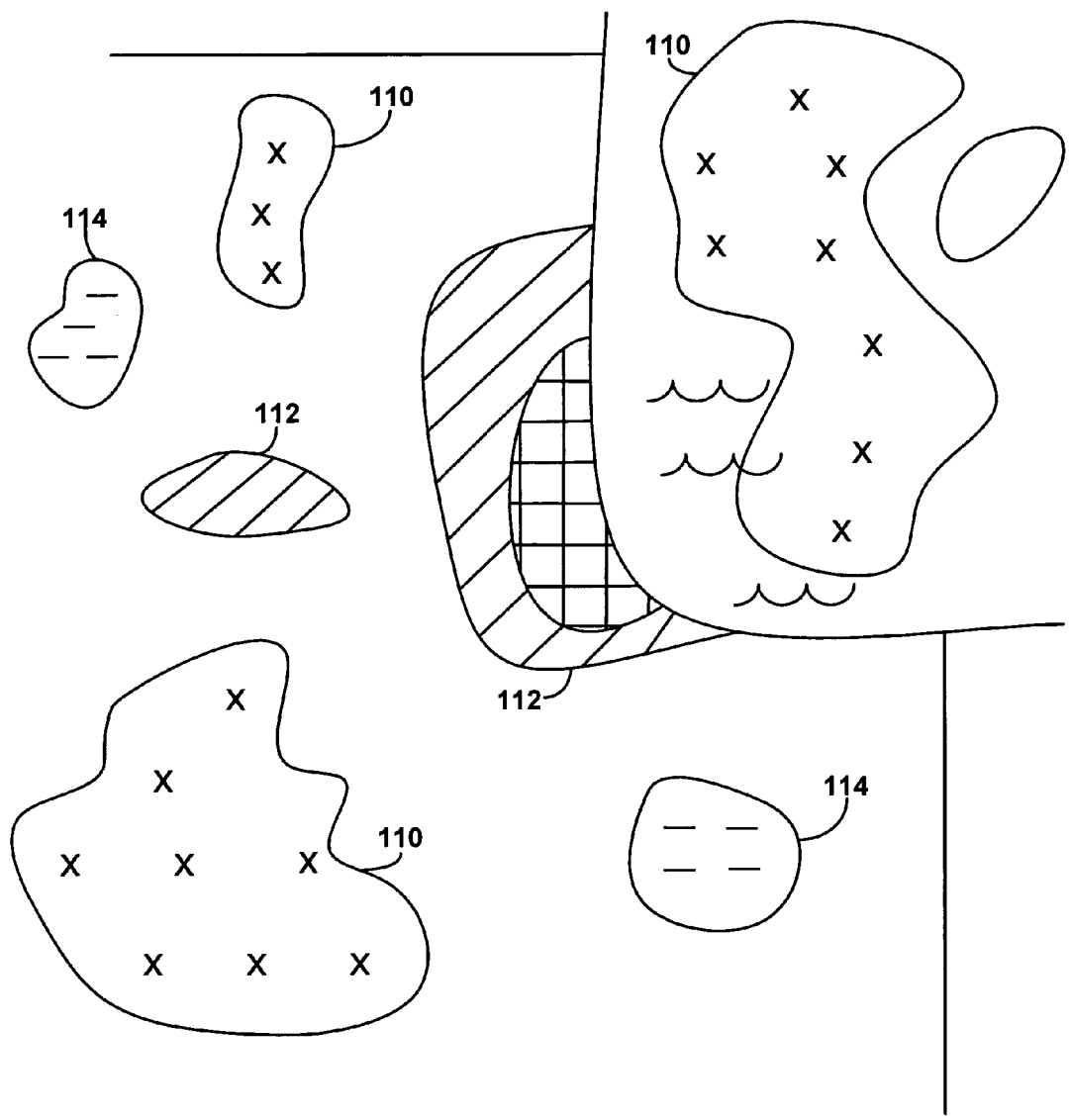
FIG. 9 is an illustration of a region showing the geographic distribution of problem areas (e.g., dropped calls) and high value customers, which can be used to plan analyze drive test routes.

Consider for example the map of FIG. 9. This shows the areas 110 where dropped calls are occurring and the areas 112 where "high value" customers are located, and areas 114 where blocked calls are occurring. Current drive test routes can be superimposed on this map and the analytical techniques applied to this map (e.g., via grids) to determine the efficiency of the drive test routes.

The computer 32 analyzing drive test routes and the geographical data could prioritize the parameters or criteria by which drive test routes are evaluated (population, usage, high value customer, problems, and possibly other parameters as well), for example using weighting formulae, when determining whether the drive test routes satisfy a criteria, e.g., are adequate according to some predetermined drive test standard. The computer might, for example, weight geographic data as to wireless device usage high, and weight geographic data for high-value customers high, and weight general population distribution data and geographic data for problem areas low, and then analyze existing drive test routes with this weighting to determine the adequacy of the drive test routes. The computer 32 could generate a signal proposing modifications to the routes. For example, the computer could generate a map showing areas that are insufficiently covered with existing drive test routes (perhaps with the areas given high weighting shown on the map) and propose modifications to the drive test routes to more thoroughly test the areas that are weighted high that are missed with existing drive test routes.

Variations and modifications from the disclosed exemplary embodiments is contemplated without departure from the scope of this invention. For example, persons skilled in the art may develop other methods of analysis of a drive test route than the specific ones that have been disclosed. The scope of the invention is to be determined by reference to the appended claims.

The invention claimed is:

1. A method for improving drive testing of a wireless communications network, comprising the steps of:
   (a) collecting drive test data from one or more drive test routes and storing the drive test data in a central database;
   (b) analyzing the drive test routes with a programmed computing unit to determine whether the drive test routes satisfy one or more defined conditions; and
   (c) in response to the analyzing in step (b), automatically generating an output signal relating to the analysis in step (b) for use by a human operator to improve the drive test routes;
   wherein the defined condition comprises an overlap condition between two or more drive test routes and wherein the analyzing in step (b) comprises the step of determining an extent to which the two or more drive test routes overlap.

2. The method of claim 1, wherein the output signal comprises a message indicating that an overlap condition exists.

3. The method of claim 1, wherein the output signal comprises one or more proposed drive test routes that reduces the extent of overlap determined in step (b).

4. The method of claim 1, wherein the analysis step (b) processes location data obtained during the drive test and wherein the location data is determined from a global positioning system (GPS) receiver present with devices obtaining the drive test data.

5. The method of claim 4, wherein the drive test routes are present in a pre-defined region, wherein the region is subdivided into a geographic grid, and wherein during the analysis of step (b) each element of the grid through which each of the drive test route passed is flagged, and a count is made of the number of flagged grid elements common to more than one drive test route.

6. The method of claim 5, wherein the count is compared to a predetermined threshold in step (b).

7. A method for improving drive testing of a wireless communications network, comprising the steps of:
   (a) collecting drive test data from one or more drive test routes and storing the drive test data in a central database;
   (b) analyzing the drive test routes with a programmed computing unit to determine whether the drive test routes satisfy one or more defined conditions; and
   (c) in response to the analyzing in step (b), automatically generating an output signal relating to the analysis in step (b) for use by a human operator to improve the drive test routes;
   wherein the defined condition comprises an extent to which one or more drive test routes have covered a population distribution in a pre-defined region.

8. The method of claim 7, wherein the output signal comprises a message indicating that the one or more drive test routes have or have not covered a threshold extent of the population of the pre-defined region.

9. The method of claim 8, wherein the output signal comprises one or more proposed drive test routes that increases the coverage of the population distribution.

10. The method of claim 8, wherein the pre-defined region is divided into census blocks, each having either a known or estimated population, and wherein step b) comprises the steps of 1) flagging each census block through which at least one drive test route passed; 2) totaling the population of the flagged census blocks; and 3) comparing the population of the flagged census blocks with the total population in the pre-defined region; and wherein the output signal in step c) provides an indication of the result of the comparison.

11. The method of claim 8, wherein the pre-defined region is divided into census blocks, each having either a known or estimated population, and wherein step b) comprises the steps of 1) determining the length along which a drive test route passed through each census block, 2) multiplying the length by a width representative of a range of communication to and from the drive test unit used in the drive test so as to establish an approximate measure of the area of each census block actually covered by the drive test route; 3) for each census block covered by the drive test route, comparing the area in step 2) to the total area of the census block to determine the fraction of the census block covered by the drive test route; and 4) for each census block covered by the drive test route, multiplying the fraction of the census block covered by the total population of the census block to determine an approximation of the population covered by the drive test route through the census block.

12. The method of claim 11, wherein step b) further comprises the steps of comparing the approximation of the population covered with the total population of the pre-determined area.

13. The method of claim 11, wherein step b) further comprises the steps of comparing the approximation of the population covered with a threshold value.

14. The method of claim 8, wherein the pre-defined region is divided into census blocks, each having either a known or estimated population, and wherein step b) comprises the steps of 1) flagging each census block through which at least one drive test route passed; and 2) determining which census blocks were not covered by the at least one drive test route, and wherein the output signal comprises a listing of the census blocks is step 2).

15. The method of claim 8, wherein the pre-defined region is divided into census blocks, each having either a known or estimated population, and wherein step b) comprises the steps of 1) flagging each census block through which at least one drive test route passed; and 2) determining which census blocks were not covered by the at least one drive test route, and wherein the output signal comprises a proposed drive test route that covers at least one uncovered census block.

16. A system for analyzing drive test routes, comprising:
a memory storing drive test data for at least one drive test route and geographic data related to a geographic area associated with the drive test data, the geographic data are selected from the group of data consisting of (1) geographic population distribution; (2) geographic distribution of wireless device usage; (3) geographic distribution of problems with wireless service; and (4) geographic distribution of either where a subset of customers of a wireless service are located or where said subset of customers use their wireless devices;
a computing unit coupled to the memory executing a set of program instructions which analyze the drive test routes to determine whether the drive test routes satisfy one or more defined conditions relative to the geographic data; and
the program instructions generating an output signal relating to the analysis of the drive test routes for use by a human operator to improve the drive test routes;
wherein the defined condition comprises an overlap condition between two or more drive test routes and wherein program instructions determining an extent to which the two or more drive test routes overlap within the geographic area associated with the drive test data.

17. The system of claim 16, wherein the output signal comprises a message indicating that an overlap condition exists.

18. The system of claim 17, wherein the program instructions further comprise instructions developing one or more proposed drive test routes that reduces the extent of overlap between two or more drive test routes.

19. A system for analyzing drive test routes, comprising:
a memory storing drive test data for at least one drive test route and geographic data related to a geographic area associated with the drive test data, the geographic data are selected from the group of data consisting of (1) geographic population distribution; (2) geographic distribution of wireless device usage; (3) geographic distribution of problems with wireless service; and (4) geographic distribution of either where a subset of customers of a wireless service are located or where said subset of customers use their wireless devices;
a computing unit coupled to the memory executing a set of program instructions which analyze the drive test routes to determine whether the drive test routes satisfy one or more defined conditions relative to the geographic data; and
the program instructions generating an output signal relating to the analysis of the drive test routes for use by a human operator to improve the drive test routes,
wherein the defined condition comprises an extent to which one or more drive test routes have covered a population distribution in a pre-defined region.

20. The system of claim 19, wherein the output signal comprises a message indicating that the one or more drive test routes have or have not covered a threshold extent of the population distribution in the pre-defined region.

21. The system of claim 20, wherein the program instructions further include instructions developing one or more proposed drive test routes that increases the coverage of the population distribution.

22. The system of claim 19, wherein the pre-defined region is divided into census blocks, each having either a known or estimated population, and the instructions perform the following operations 1) flag each census block through which at least one drive test route passed; 2) total the population of the flagged census blocks; and 3) compare the population of the flagged census blocks with the total population in the pre-defined region; and wherein the output signal provides an indication of the result of the comparison.

23. The system of claim 19, wherein the pre-defined region is divided into census blocks, each having either a known or estimated population, and wherein the instructions perform the following operations: 1) determining a length along which a drive test route passed through each census block, 2) multiply the length by a width representative of a range of communication to and from the drive test unit used in the drive test so as to establish an approximate measure of the area of each census block actually covered by the drive test route; 3) for each census block covered by the drive test route, compare the area in step 2) to the total area of the census block to determine the fraction of the census block covered by the drive test route; and 4) for each census block covered by the drive test route, multiplying the fraction of the census block covered by the total population of the census block to determine an approximation of the population covered by the drive test route through the census block.

24. The system of claim 23, wherein the instructions further compare the approximation of the population covered with the total population of the pre-determined area.

25. The system of claim 23, wherein the instructions compare the approximation of the population covered with a threshold value.

26. The system of claim 19, wherein the pre-defined region is divided into census blocks, each having either a known or estimated population, and wherein the instructions include instructions that: 1) flag each census block through which at least one drive test route passed; and 2) determine which census blocks were not covered by the at least one drive test route, and wherein the output signal comprises a listing of the census blocks is process 2).

27. The system of claim 19, wherein the pre-defined region is divided into census blocks, each having either a known or estimated population, and wherein the program instructions comprise instructions that: 1) flag each census block through which at least one drive test route passed; and 2) determine which census blocks were not covered by the at least one drive test route, and wherein the output signal comprises a proposed drive test route that covers at least one uncovered census block.

* * * * *